United States Patent
DeForge et al.

(10) Patent No.: US 11,146,251 B2
(45) Date of Patent: Oct. 12, 2021

(54) PERFORMANCE-SCREEN RING OSCILLATOR WITH SWITCHABLE FEATURES

(71) Applicant: International Business Machines Corporation, Armonk, NY (US)

(72) Inventors: John B. DeForge, Barre, VT (US); Kirk D. Peterson, Jericho, VT (US); Theresa Newton, St. George, VT (US); Andrew Turner, Underhill, VT (US); Terence B. Hook, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/811,805

(22) Filed: Mar. 6, 2020

(65) Prior Publication Data

US 2021/0281248 A1    Sep. 9, 2021

(51) Int. Cl.
*H03K 3/03*     (2006.01)
*G06F 30/367*   (2020.01)
*G01R 31/26*    (2020.01)
*G06F 119/12*   (2020.01)

(52) U.S. Cl.
CPC ......... *H03K 3/0315* (2013.01); *G06F 30/367* (2020.01); *G01R 31/2607* (2013.01); *G06F 2119/12* (2020.01)

(58) Field of Classification Search
CPC ............................ H03K 3/0315; H03K 3/0322
USPC ........................................................ 331/57
See application file for complete search history.

(56) References Cited

U.S. PATENT DOCUMENTS

| | | | | |
|---|---|---|---|---|
| 5,315,271 A | * | 5/1994 | Pascual | H03L 7/0997 331/25 |
| 5,355,097 A | * | 10/1994 | Scott | H03L 7/10 331/1 A |
| 5,847,617 A | * | 12/1998 | Reddy | H03K 3/0315 331/57 |
| 6,114,915 A | * | 9/2000 | Huang | H03K 23/665 331/1 A |
| 6,253,352 B1 | * | 6/2001 | Hanriat | G01R 31/3016 327/276 |

(Continued)

FOREIGN PATENT DOCUMENTS

EP        1608063 A2     12/2005

OTHER PUBLICATIONS

Kerrison et al. A software controlled voltage tuning system using multi-purpose ring oscillators, 2015, 12 pages https://arxiv.org/pdf/1503.05733.pdf.

(Continued)

*Primary Examiner* — Levi Gannon
(74) *Attorney, Agent, or Firm* — Erik Johnson; Otterstedt, Wallace & Kammer, LLP (57) ABSTRACT

A method and performance-screen ring oscillator (PSRO) test structure for designing, testing, and manufacturing a VLSI device. The performance-screen ring oscillator (PSRO) test structure comprises a ring oscillator having a plurality of stages; one or more selectable loads, each selectable load being coupled to an output of a corresponding one of the stages of the ring oscillator; and one or more multiplexers, each multiplexer being coupled to at least one stage of the ring oscillator and being configured to select a configuration of the corresponding selectable load.

15 Claims, 7 Drawing Sheets

(56) References Cited

U.S. PATENT DOCUMENTS

| | | | | |
|---|---|---|---|---|
| 7,382,165 | B2* | 6/2008 | Gonzalez | H03K 19/177 |
| | | | | 327/39 |
| 8,816,778 | B2* | 8/2014 | Bracmard | G06F 1/08 |
| | | | | 331/2 |
| 8,878,616 | B2* | 11/2014 | Dixit | H03K 3/02 |
| | | | | 331/57 |
| 9,148,156 | B2 | 9/2015 | Aryanfar et al. | |
| 9,209,821 | B2 | 12/2015 | Bichan et al. | |
| 9,335,376 | B2 | 5/2016 | Cheng et al. | |
| 9,596,037 | B2 | 3/2017 | Hsueh et al. | |
| 9,858,042 | B1* | 1/2018 | Diamant | H03K 3/0315 |
| 2004/0227527 | A1 | 11/2004 | Bortesi et al. | |
| 2005/0068110 | A1* | 3/2005 | Hui | H03K 5/133 |
| | | | | 331/1 A |
| 2007/0040620 | A1* | 2/2007 | Boerstler | H03K 3/0315 |
| | | | | 331/57 |
| 2007/0247240 | A1* | 10/2007 | Morini | H03K 5/133 |
| | | | | 331/57 |
| 2015/0370938 | A1 | 12/2015 | Kawa et al. | |
| 2016/0233136 | A1 | 8/2016 | Hargan et al. | |
| 2018/0343004 | A1* | 11/2018 | Yoshioka | G06N 3/063 |

OTHER PUBLICATIONS

Liu et al. An Accurate Interconnect Test Structure for Parasitic Validation in On-Chip Machine Learning Accelerators, 2017, 27 pages https://arxiv.org/pdf/1701.03181.

* cited by examiner

PERFORMANCE-SCREEN RING OSCILLATOR WITH SWITCHABLE FEATURES

BACKGROUND

The present invention relates to the electrical, electronic, and computer arts, and more specifically, to a ring oscillator for a semiconductor device.

Performance-screen ring oscillators (PSROs) are commonly used to monitor and predict functional performance of a very large-scale integration (VLSI) device at functional speed. Multiple instances of the PSRO are typically spread about the VLSI device to enable tracking and monitoring of critical paths located in different regions of the device. While functional speed and PSRO performance often track closely, it is known that this is not always the case, and that there are elements in the functional critical path that are evidently not accounted for by the PSRO design.

SUMMARY

Principles of the invention provide techniques for implementing and utilizing a performance-screen ring oscillator with switchable features and for monitoring and predicting the functional performance of a VLSI device using the disclosed PSRO. In one aspect, an exemplary method includes the operations of designing at least one type of performance-screen ring oscillator (PSRO), each type of performance-screen ring oscillator (PSRO) design comprising at least one switchable feature; placing one or more of the at least one type of performance-screen ring oscillator (PSRO) design across a VLSI design; selecting one or more of the at least one switchable feature that best represents one or more predicted or observed critical paths of a given circuit for each placed performance-screen ring oscillator (PSRO) design; fabricating a VLSI device based on the VLSI design; conducting an analysis that compares an observed critical path behavior of logic of the VLSI device and performance-screen ring oscillator (PSRO) data; determining if a timing model is satisfactory; and updating the timing model and a design of critical paths in response to the timing model being not satisfactory (such as an inadequate timing model).

In one aspect, a performance-screen ring oscillator (PSRO) test structure comprises a ring oscillator having a plurality of stages; one or more selectable loads, each selectable load being coupled to an output of a corresponding one of the stages of the ring oscillator; and one or more multiplexers, each multiplexer being coupled to at least one stage of the ring oscillator and being configured to select a configuration of the corresponding selectable load.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented using a computer program product including a computer readable storage medium with computer usable program code for performing the method steps indicated. Furthermore, one or more embodiments of the invention or elements thereof can be using a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

a performance-screen ring oscillator with selectable phase;

selective enablement of alternate performance-critical elements with the same front-end-of-line (FEOL) ring elements;

model hardware verification while removing common mode locality, sensing infrastructure, and the like;

efficient utilization of device logic area by utilizing a configurable, multi-mode PSRO;

representation of nearby logic circuits based on observed, measurable critical paths vs. anticipated critical paths (monitorable during normal operation and episodes of degradation); and stimulation of neighboring lines in-phase, out-of-phase, or at any specified relative phase.

These and other features and advantages of the present invention will become apparent from the following detailed description of illustrative embodiments thereof, which is to be read in connection with the accompanying drawings.

DETAILED DESCRIPTION

Generally, a performance-screen ring oscillator (PSRO) with switchable features is disclosed. One or more embodiments of the PSRO provide for the selective enablement of performance-critical elements with the same FEOL ring elements. The PSRO provides a test structure with a variable reactive load where the load is coupled, for example, to a signal of adjustable phase, a floating load, and the like. In conventional design analysis, a critical path in a center of a core is expected to be driven by various criteria, such as the medium threshold voltage (VT) devices, buffer cascades, and the like. This results, for example, in the signal coupling/noise being in-phase with the direct current (DC) lines. A PSRO representing this criteria is designed and located in the center of the circuit or nearby the circuit being represented. In cases where it is later realized that the coupling is not in-phase and that the PSRO does not accurately represent the logic of the circuit, the PSRO may prove ineffective for testing. By utilizing the disclosed multi-mode PSRO, the PSRO can be reconfigured to more accurately represent the logic of the circuit in terms of the observed, measurable critical path (vs. the anticipated critical path).

In one example embodiment, a wire load is configured such that neighboring lines are stimulated in-phase, out-of-phase, or at any desired relative phase. The wire load can also be established as an alternating current (AC) ground or left floating. The configuration of the load is determined by a select signal, where the load is coupled to a 180 degrees out-of-phase signal in a first mode, the load is coupled to an in-phase signal in a second mode, and the load is coupled to an adjustable phase signal by connecting the load to a variable phase rotator in a third mode. In one example embodiment, the load can be coupled to AC ground (in a fourth mode), or left floating (in a fifth mode). In general, for each stage of the PSRO, any number of selectable modes may be utilized, including only one mode (essentially a hardwiring of the stage for the specified mode, such as in-phase).

In one example embodiment, the 180 degrees out-of-phase signal is generated by connecting the load to a previous stage of the PSRO and the in-phase signal is generated by connecting the load to a stage of the PSRO that is two stages earlier than the stage of the load. In one example embodiment, the load is a wire, multiple levels of wire, a vertical interconnect (such as a via), and the like. One or more embodiments may be implemented with different wiring levels or dimensions, as desired. For example, if a device being modeled only utilizes levels to metal level 3, there is no need for the PSRO to represent metal level 4 or higher. In reality, often too many degrees of freedom are encountered. In this case, sensitivity analysis on the degrees of freedom for the timing model may be performed to determine the particular degrees of freedom that should be utilized. For example, if the resistance load on the timing is more sensitive to vias and less sensitive to wires, a single via structure is utilized and auto-routing is prevented to allow component by component analysis. One or more embodiments differ from conventional implementations, wherein the PSRO is merely designed based upon transistor types and device cells. Testing may then be performed by selecting various modes for each stage of the PSRO to separate the contribution of each component. In one example embodiment, different modes are sequentially selected in order to test different aspects of the design and implementation of the VLSI device.

Figure 1:
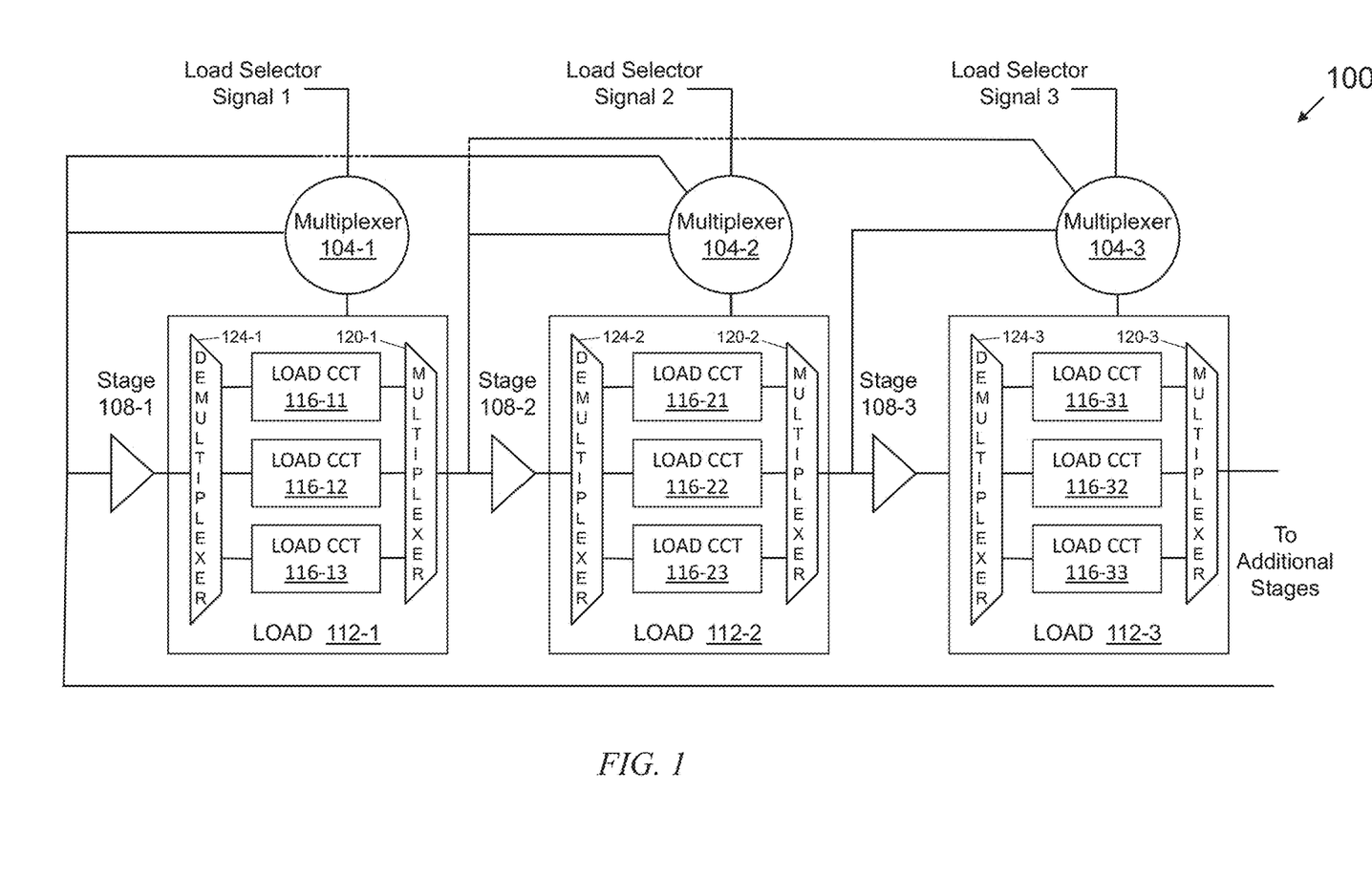
FIG. 1 is a schematic diagram of a portion of a performance-screen ring oscillator, in accordance with an example embodiment.

FIG. 1 is a schematic diagram of a portion of a performance-screen ring oscillator 100, in accordance with an example embodiment. In one example embodiment, a load selector signal selects the mode of the PSRO 100. In one example embodiment, a separate load selector signal is dedicated to each of a plurality of sets of stages of the PSRO 100, where the set may include only a single stage of the PSRO 100 and the stages of the set need not be contiguous. In some embodiments, as noted above, one or more stages of the PSRO 100 may be hardwired for a particular mode, such as in-phase, floating, and the like.

A multiplexer 104-1, 104-2, 104-3 (collectively referred to as multiplexers 104 herein) configures the mode of a corresponding stage 108-1, 108-2, 108-3 (collectively referred to as stages 108 herein) based on the load select signal. It will be appreciated that three multiplexers and three stages are shown in the non-limiting example of FIG. 1 but other numbers of multiplexers and stages could be provided in other embodiments.

Figure 2:
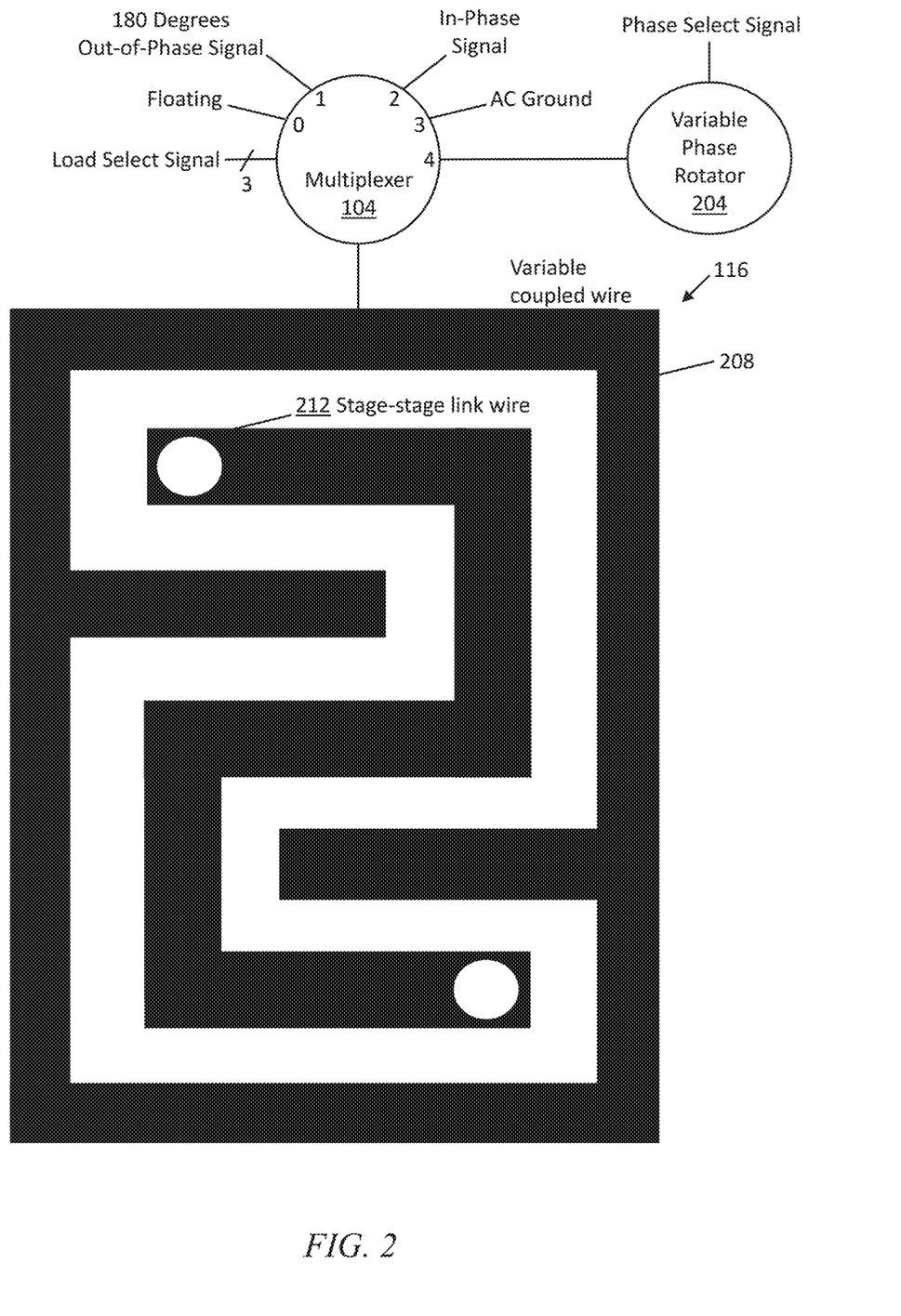
FIG. 2 is a schematic diagram of an example multiplexer and example capacitive load circuit for a performance-screen ring oscillator, in accordance with an example embodiment.

As illustrated in FIG. 1, two of the inputs to the multiplexer 104-3 are from the outputs of earlier stages of the PSRO 100, specifically, the outputs from stages 108-1 and 108-2. The outputs of earlier stages of the PSRO 100 are used to generate the 180 degrees out-of-phase and the in-phase signals, as described above. The other inputs of the multiplexer 104-3 are omitted to avoid clutter, but are illustrated in FIG. 2. In addition, some stages may be hardwired for a certain mode, such as hardwired for an in-phase signal. Moreover, as described above, a load select signal may be configured to control a set of one or more multiplexers 104, or each of a plurality of load select signals may be configured to each control a corresponding set of one or more multiplexers 104 of a plurality of sets, where each set includes one or more multiplexers 104. Each load selector signal may include one or more bits (based on the count of multiplexers 104 in the corresponding set).

In one example embodiment, each load 112-1, 112-2, 112-3 (collectively referred to as loads 112 herein) is a capacitive load, that is, the load from multiplexer 104 is capacitively coupled to the signal that propagates from one stage 108 to another stage 108, as described more fully below in conjunction with FIG. 2. Each load 112 includes a corresponding load demultiplexer 124-1, 124-2, 124-3 (collectively referred to as load demultiplexers 120 herein), a corresponding load multiplexer 120-1, 120-2, 120-3 (collectively referred to as load multiplexers 120 herein), and one or more capacitive load circuits 116-11, 116-12, 116-13, 116-21, 116-22, 116-23, 116-31, 116-32, and 116-33 (collectively referred to as capacitive load circuits 116 herein and described more fully below in conjunction with FIG. 2). Each load demultiplexer 120 is dynamically configured to connect its input to one or more outputs of the corresponding load demultiplexer 124-1, 124-2, 124-3. In this manner, one or more capacitive load circuits 116 are coupled to the output of the corresponding stage 108. For example, the output of stage 108-1 is coupled via the load demultiplexer 124-1 to one or more of the capacitive load circuits 116-11, 116-12, 116-13.

Each load multiplexer 120 is dynamically configured to connect only one of its inputs to its output. The input selected should correspond to one of the outputs of the corresponding load demultiplexer 124 that has been selected in order to complete the circuit path. For example, if capacitive load circuit 116-12 is coupled to the output of the stage 108-1 by the corresponding load demultiplexer 124, the capacitive load circuit 116-12 may be coupled to the output of the load multiplexer 120-1.

In one example embodiment (not shown), the signals that would be input to a load multiplexer 120 are hardwired together and used as an input to the next stage 108, thereby eliminating the need for the load multiplexer 120. In this embodiment, each load demultiplexer 124 couples the output of the corresponding stage 108 to one or more of the corresponding capacitive load circuits 116, as desired. The corresponding multiplexor 104 couples the appropriate load to the selected capacitive load circuits 116 and couples a floating signal to the unselected capacitive load circuits 116.

FIG. 2 is a schematic diagram of an example multiplexer 104 and example capacitive load circuit 116 for a performance-screen ring oscillator 100, in accordance with an example embodiment. In one example embodiment, the capacitive load circuit 116 is a capacitive load that incorporates a variable coupled wire 208 and a stage-stage link wire 212 that interconnects two stages of the PSRO 100 (that is, an output of a stage 108). The variable coupled wire 208 is coupled to a corresponding multiplexer 104. The multiplexer 104 couples one of a plurality of multiplexer inputs (labeled 0 to 4 in FIG. 2) to the variable coupled wire 208 based on the data value of the load select signal. In the example embodiment of FIG. 2, the load selector signal includes three bits to provide for the selection of one of the five multiplexer inputs 208 illustrated in FIG. 2. The number of bits for the load selector signal may be greater or less than three depending on the count of multiplexer input types utilized. In the example embodiment of FIG. 2, a select data value of zero selects a floating input, a select data value of one selects a 180 degrees out-of-phase signal (by coupling the load 112 to the previous stage 108 of the PSRO 100), a select data value of two selects an in-phase signal (by coupling the load 112 to a stage 108 of the PSRO 100 that is two stages earlier), a select data value of three selects an input of AC ground, and a select data value of four selects an output from a variable phase rotator 204 (also referred to as an active phase rotator). The variable phase rotator 204 generates a signal with a selectable phase, where the phase of the generated signal is selected by a phase select signal. In general, dynamic and/or static inputs may be generated. Other types of inputs include signals from noise generators, phasors, and the like. PSRO configurations may also be implemented to address connections, various types of coupling, and the like.

Figure 3:
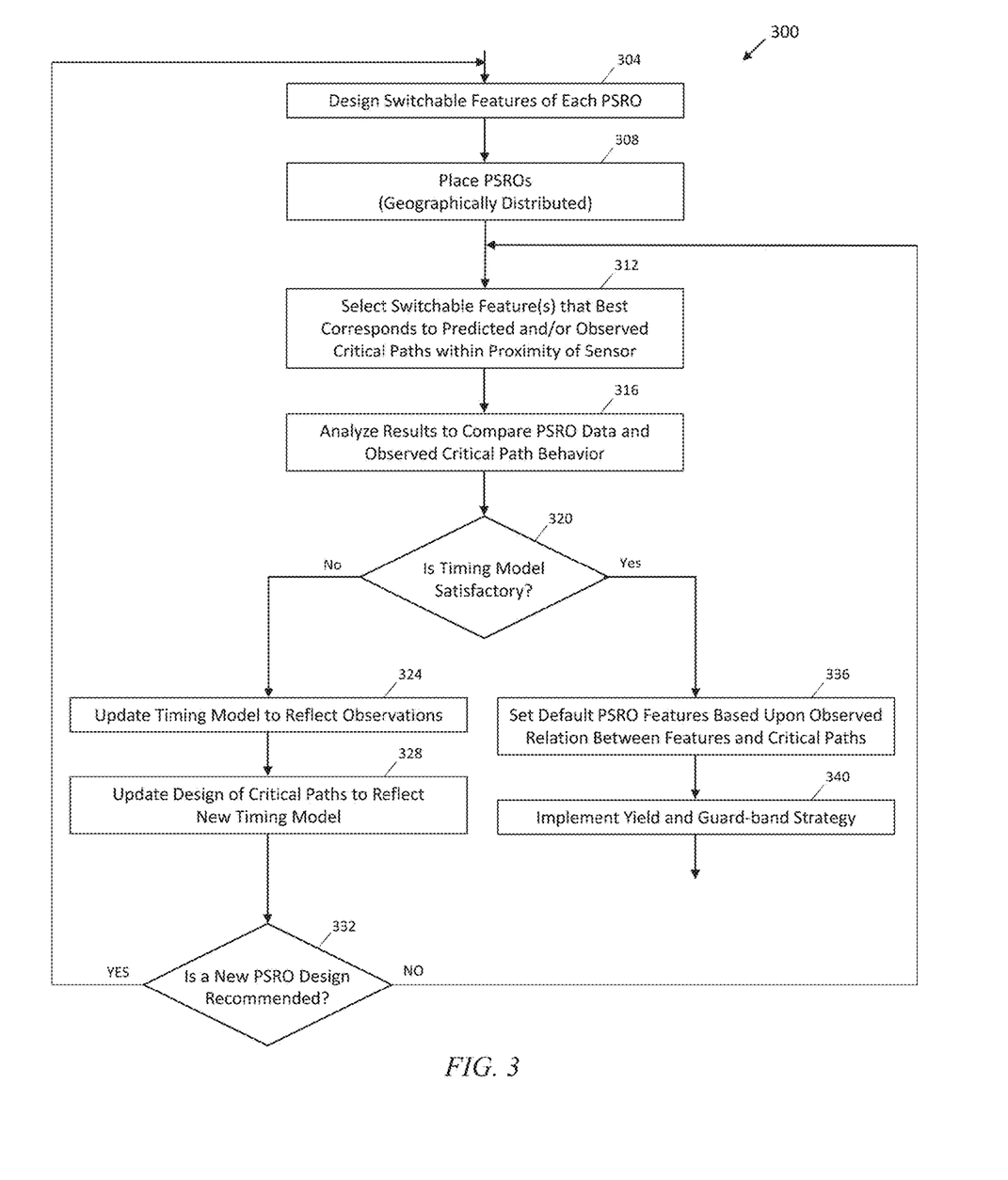
FIG. 3 is a flowchart for an example method for utilizing the performance-screen ring oscillator as a test structure, in accordance with an example embodiment.

FIG. 3 is a flowchart 300 for an example method for utilizing the performance-screen ring oscillator 100 as a test structure, in accordance with an example embodiment. In one example embodiment, the switchable features of each type of PSRO 100 are designed (operation 304). The design and switchable features should target and be based on the power, timing, device type (such as single oxide), and the like of the VLSI design. In one example embodiment, one or more different designs of the PSRO 100 are selected from a PSRO library.

One or more of the designed PSROs 100 are then placed across a VLSI design (operation 308). As described above, the design of the PSRO 100 is chosen to represent the logic of the circuit under consideration and is placed near the circuit under consideration. The placement should consider the device floor plan, wiring constraints, the predicted and/or observed critical paths, and the like. The switchable features of each PSRO 100 that best represent the predicted and/or observed critical paths of the circuit under consideration are selected (operation 312). Following the fabrication of a device, an analysis is conducted that compares the observed critical path behavior of the logic of the device and the PSRO data (operation 316). The expectation of the analysis is that the PSRO data (delay per stage) will track with the response of the critical circuit appropriately. The analysis includes running tests utilizing the logic of the device and identifying the critical paths during testing. In one example embodiment, all of the degrees of freedom provided by the PSRO 100 and the logic tests are exercised, in parallel and/or sequentially.

A check is then performed to determine if the timing model is satisfactory (decision block 320). In other words, does the timing model satisfactorily represent the actual implementation of the logic? If the timing model is not satisfactory (NO branch of decision block 320), the timing model is updated (operation 324) and the design of the critical paths is updated based on the new timing model (operation 328). For example, if the observed critical paths for the functional logic are more sensitive to wire delay than predicted, the design of the critical paths is updated accordingly. A check is then performed to determine if the design of the PSRO 100 is satisfactory (decision block 332). If a new design of the PSRO 100 is recommended (YES branch of decision block 332), the method 300 proceeds with operation 304. If a new design of the PSRO is not recommended (NO branch of decision block 332), the method 300 proceeds with operation 312.

Returning to decision block 320, if the timing model is satisfactory (YES branch of decision block 320), the default features of each PSRO 100 are set based upon the observed relation between the PSRO features and the critical paths (operation 336). For example, the features that best represent the logic based on the observed test results and corresponding critical paths are selected as the initial configuration of the PSRO 100. A yield and guard-band strategy are implemented (operation 340). For example, since every die is different, the PSRO 100 is essentially used as a performance measuring stick for each fabricated VLSI device. A performance guard-band can then be established by running the device at, for example, a frequency greater than the specified operational frequency of the VLSI device in order to ensure that the device meets specified performance specifications as the device naturally degrades over time.

In one example embodiment, the switchable-features are used to find the natural frequency response of a new load (switchable feature that has been implemented in this instance: 112-1) and to make characterization measurements to observe the impact of that new load configuration (combination of multiplexer 104 and load 112). In one example embodiment, a pair of delay lines is slowed to create a phase difference that generates coupling effects. The effects on the performance of the ring oscillator are then observed.

In one or more embodiments, after step 340, the design process is complete and the design moves to production; the PSROs can be used during the production process, as described elsewhere herein.

Given the discussion thus far, it will be appreciated that, in general terms, an exemplary method, according to an aspect of the invention, includes the operations of designing at least one type of performance-screen ring oscillator (PSRO) 100, each type of performance-screen ring oscillator (PSRO) design comprising at least one switchable feature (operation 304); placing one or more of the at least one type of performance-screen ring oscillator (PSRO) design across a VLSI design (operation 308); selecting one or more of the at least one switchable feature that best represents one or more predicted or observed critical paths of a given circuit for each placed performance-screen ring oscillator (PSRO) design (operation 312); fabricating a VLSI device based on the VLSI design; conducting an analysis that compares an observed critical path behavior of logic of the VLSI device and performance-screen ring oscillator (PSRO) data (operation 316); determining if a timing model is satisfactory (operation 320); and updating the timing model and a design of critical paths in response to the timing model being not satisfactory (such as the timing model being inadequate to describe the hardware behavior) (operations 324 and 328).

The VLSI device can, for example, be physically produced after the VLSI Model has been adjusted using this method.

In one aspect, a performance-screen ring oscillator (PSRO) test structure comprises a ring oscillator 100 having a plurality of stages 108; one or more selectable loads 112, each selectable load 112 being coupled to an output of a corresponding one of the stages 108 of the ring oscillator 100; and one or more multiplexers 104, each multiplexer 104 being coupled to at least one stage 108 of the ring oscillator 100 and being configured to select a configuration of the corresponding selectable load 112.

In one example embodiment, a first mode couples the selectable load 112 to a 180 degree out-of-phase signal. In one example embodiment, at least one multiplexer 104 couples the corresponding selectable load 112 to an output of a stage 108 of the ring oscillator 100 that is one stage earlier than a stage 108 of the selectable load 112. In one example embodiment, a second mode couples the selectable load 112 to an in-phase signal. In one example embodiment, at least one multiplexer 104 couples the corresponding selectable load 112 to an output of a stage 108 of the ring oscillator 100 that is two stages earlier than a stage 108 of the selectable load 112. In one example embodiment, a third mode couples the selectable load 112 to alternating current (AC) ground. In one example embodiment, at least one multiplexer 104 couples the corresponding selectable load 112 to alternating current (AC) ground.

In one example embodiment, a fourth mode couples the selectable load 112 to a signal having a variable phase. In one example embodiment, at least one multiplexer 104 couples the corresponding selectable load 112 to an output of an active phase rotator 204, the active phase rotator 204 controlled by a phase select signal. In one example embodiment, a fifth mode configures the selectable load 112 to electrically float. In one example embodiment, at least one multiplexer 104 configures the corresponding selectable load 112 to electrically float. In one example embodiment, the selectable load 112 is a wire or multiple levels of wire. In one example embodiment, the selectable load 112 is a vertical interconnect. In one example embodiment, a mode for a given stage 108 is hardwired. In one example embodiment, the one or more multiplexers include one or more input ports configured to obtain, as input, a load selector signal configured to select a mode for one or more stages 108 of the performance-screen ring oscillator (PSRO) 100; the signal can be provided, for example, from a suitable control block (omitted to avoid clutter).

Figure 4:
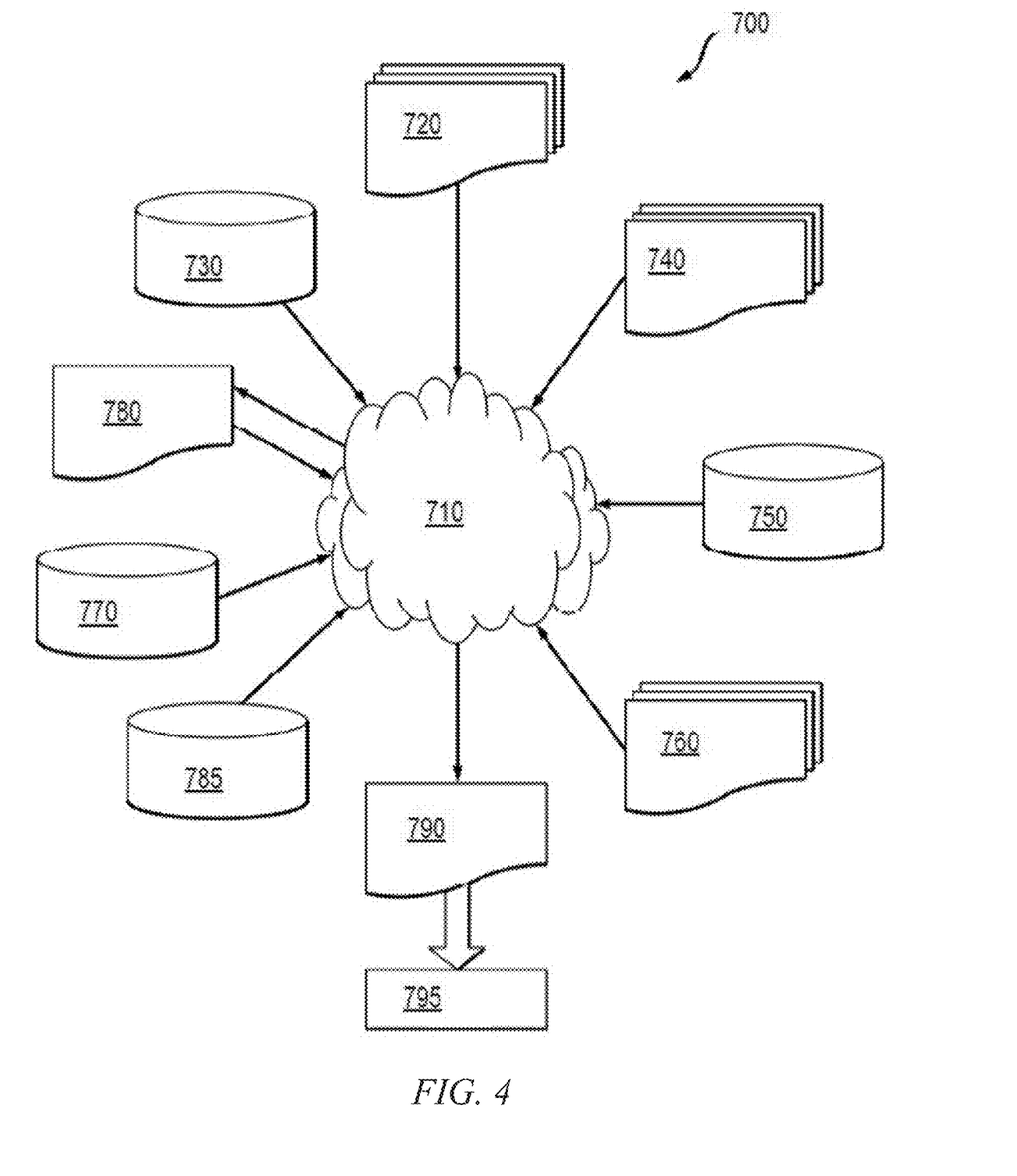
FIG. 4 is a flow diagram of a design process used in semiconductor design, manufacture, and/or test.

In one example embodiment, a determination is made if a given performance-screen ring oscillator (PSRO) design corresponding to at least one fabricated performance-screen ring oscillator (PSRO) is not satisfactory (decision block 332); the given performance-screen ring oscillator (PSRO) design is updated in response to the corresponding performance-screen ring oscillator (PSRO) design not being satisfactory (operation 304); a determination is made if the one or more selected features of the at least one fabricated performance-screen ring oscillator (PSRO) are not satisfactory; and a selection of the one or more switchable features of the at least one fabricated performance-screen ring oscillator (PSRO) is updated in response to the selected features of the at least one fabricated performance-screen ring oscillator (PSRO) not being satisfactory. In one example embodiment, one or more default features of each performance-screen ring oscillator (PSRO) of the VLSI design are set based upon an observed relation between the one or more selectable features and the observed critical paths (operation 336); and a yield and guard-band strategy is implemented based on observed test results of the VLSI device (operation 340). In one example embodiment, the VLSI design is instantiated as a design structure 720; and a physical integrated circuit is fabricated in accordance with the design structure 720. In one example embodiment, the method is repeated in response to the timing model being not satisfactory.

In one or more embodiments, a further step includes fabricating a physical integrated circuit incorporating the PSRO 100. One non-limiting specific example of accomplishing this is described elsewhere herein in connection with FIGS. 4-6. For example, a design structure, based on the analyzed design, is provided to fabrication equipment to facilitate fabrication of a physical integrated circuit in accordance with the design structure.

In one or more embodiments, a layout is prepared based on the analysis.

In one or more embodiments, the layout is instantiated as a design structure.

In one or more embodiments, a physical integrated circuit is fabricated in accordance with the design structure.

Figure 5:
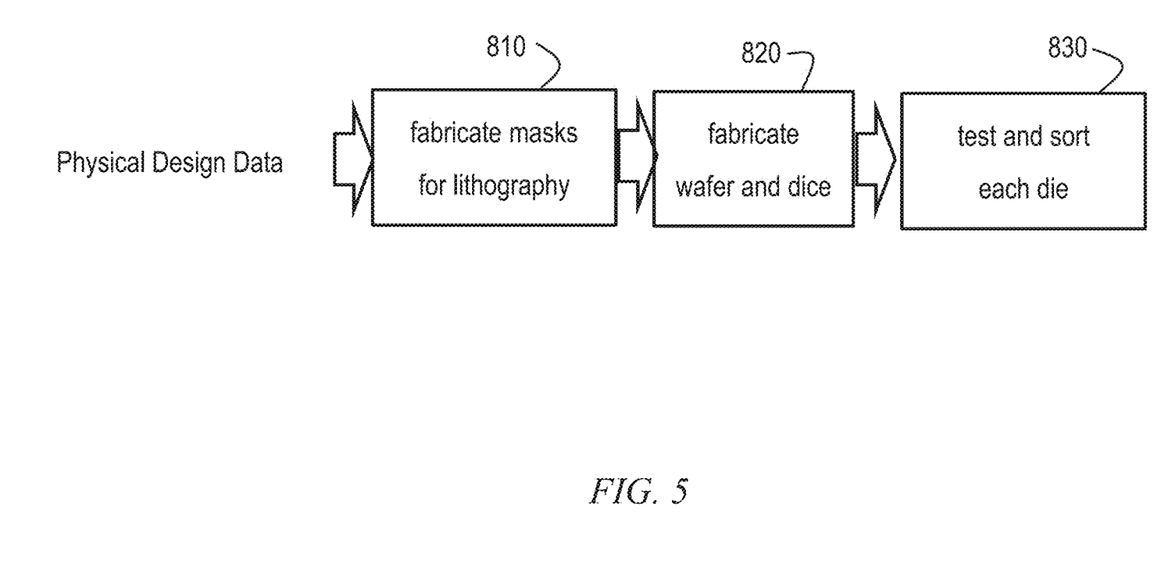
FIG. 5 shows further aspects of IC fabrication from physical design data.

As noted, in one or more embodiments, the layout is instantiated as a design structure. See discussion of FIG. 4. A physical integrated circuit is then fabricated in accordance with the design structure. See again discussion of FIG. 4. Refer also to FIG. 5. Once the physical design data is obtained, based, in part, on the analytical processes described herein, an integrated circuit designed in accordance therewith can be fabricated according to known processes that are generally described with reference to FIG. 5. Generally, a wafer with multiple copies of the final design is fabricated and cut (i.e., diced) such that each die is one copy of the integrated circuit. At block 810, the processes include fabricating masks for lithography based on the finalized physical layout. At block 820, fabricating the wafer includes using the masks to perform photolithography and etching. Once the wafer is diced, testing and sorting each die is performed at 830 to filter out any faulty die.

Figure 7:
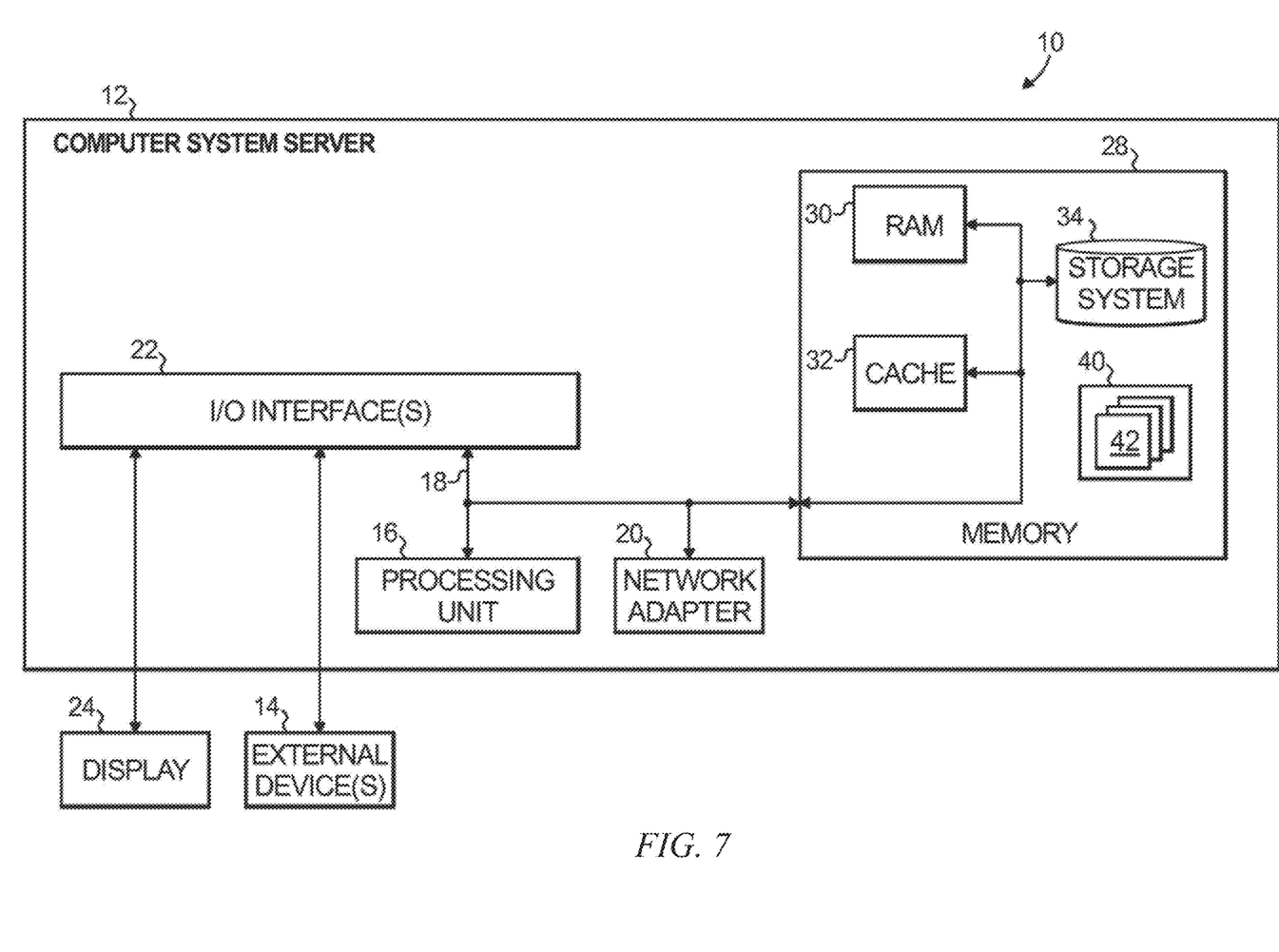
FIG. 7 depicts a computer system that may be useful in implementing one or more aspects and/or elements of the invention.

One or more embodiments include a computer including a memory 28; and at least one processor 16, coupled to the memory, and operative to carry out or otherwise facilitate any one, some, or all of the method steps described herein (as depicted in FIG. 7).

Furthermore, referring to FIG. 4, in one or more embodiments the at least one processor is operative to generate a design structure for the integrated circuit design in accordance with the analysis, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved compared to circuits designed using prior art techniques due to the comprehensive testing provided by the PSRO 100. One improvement is the result of being able to more comprehensively cover the existing circuit and feature list of the design using less real-estate (device area) and less test-time on features of little to no interest.

Figure 6:
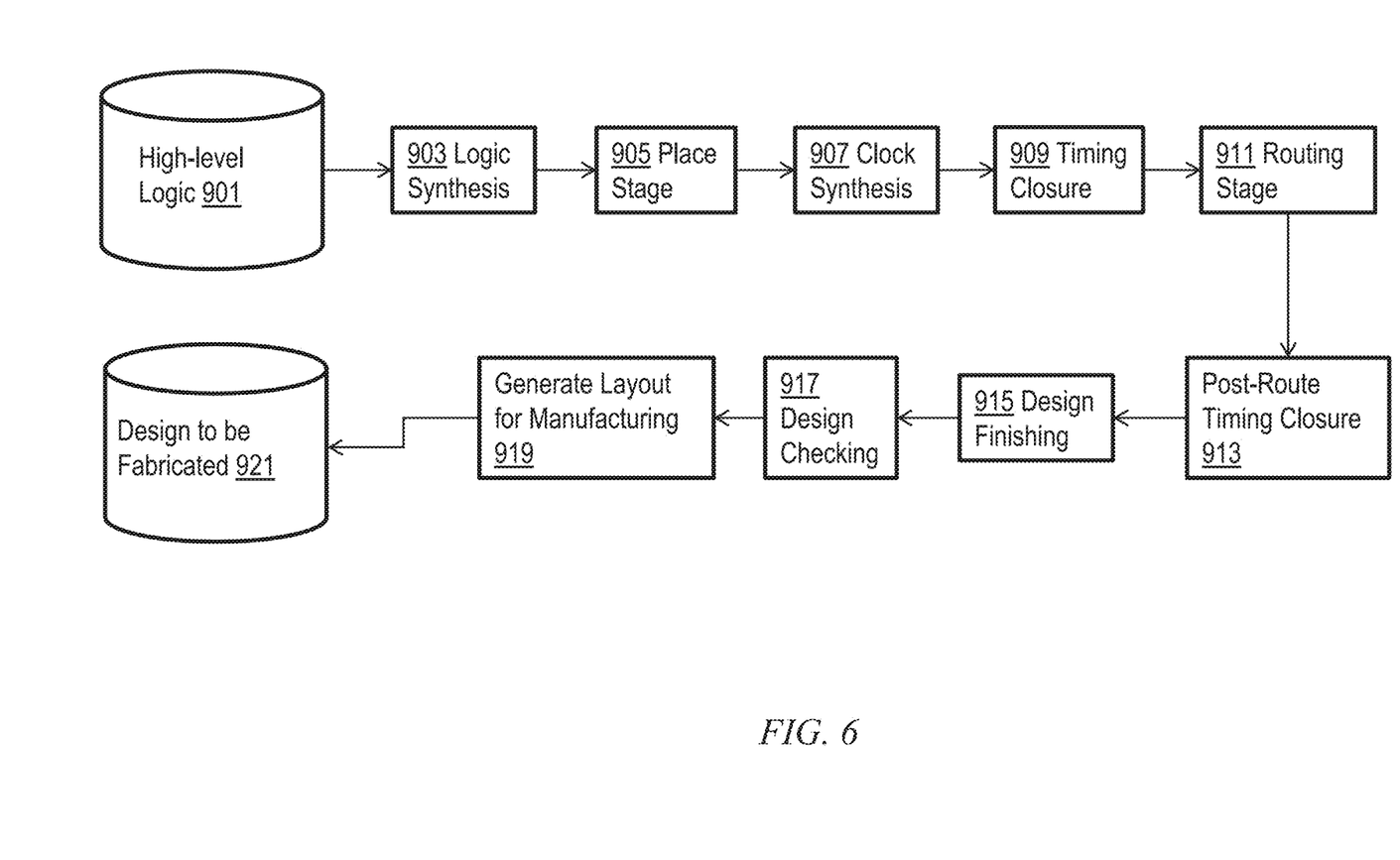
FIG. 6 shows an exemplary high-level Electronic Design Automation (EDA) tool flow, within which aspects of the invention can be employed.

FIG. 6 depicts an example high-level Electronic Design Automation (EDA) tool flow, which is responsible for creating an optimized microprocessor (or other IC) design to be manufactured. A designer could start with a high-level logic description 901 of the circuit (e.g. VHDL or Verilog). The logic synthesis tool 903 compiles the logic, and optimizes it without any sense of its physical representation, and with estimated timing information. The placement tool 905 takes the logical description and places each component, looking to minimize congestion in each area of the design. The clock synthesis tool 907 optimizes the clock tree network by cloning/balancing/buffering the latches or registers. The timing closure step 909 performs a number of optimizations on the design, including buffering, wire tuning, and circuit repowering; its goal is to produce a design which is routable, without timing violations, and without excess power consumption. The routing stage 911 takes the placed/optimized design, and determines how to create wires to connect all of the components, without causing manufacturing violations. Post-route timing closure 913 performs another set of optimizations to resolve any violations that are remaining after the routing. Design finishing 915 then adds extra metal shapes to the netlist, to conform with manufacturing requirements. The checking steps 917 analyze whether the design is violating any requirements such as manufacturing, timing, power, or noise. When the design is clean, the final step 919 is to generate a layout for the design, representing all the shapes to be fabricated in the design to be fabricated 921.

One or more embodiments of the invention, or elements thereof, can be implemented in the form of an apparatus including a memory and at least one processor that is coupled to the memory and operative to perform exemplary method steps. FIG. 7 depicts a computer system that may be useful in implementing one or more aspects and/or elements of the invention; it is referred to herein as a cloud computing node but is also representative of a server, general purpose-computer, etc. which may be provided in a cloud or locally.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/ output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described.

The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Design Process Used in Semiconductor Design, Manufacture, and/or Test

One or more embodiments integrate the characterizing and simulating techniques herein with semiconductor integrated circuit design simulation, test, layout, and/or manufacture. In this regard, FIG. 4 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of design structures and/or devices, such as those that can be analyzed using techniques disclosed herein or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 4 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 790 may comprise a compiled, executable HDL simulation model that functionally simulates the devices to be analyzed.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 790 may then proceed to a stage 795 where, for example, design structure 790: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A performance-screen ring oscillator (PSRO) test structure, the performance-screen ring oscillator (PSRO) test structure comprising:
   a ring oscillator having a plurality of stages;
   two or more selectable loads, each selectable load configured to be selectively coupled to an output of a corresponding stage of the ring oscillator; and
   one or more multiplexers, an output of each multiplexer being coupled to an output of at least one stage of the ring oscillator and at least two inputs of each multiplexer being coupled to a corresponding one of the selectable loads, the multiplexer being configured to connect one of the selectable loads to the output of the corresponding stage of the ring oscillator.

2. The performance-screen ring oscillator test structure of claim 1, wherein the selectable load in a second mode is an in-phase signal.

3. The performance-screen ring oscillator test structure of claim 2, wherein at least one multiplexer couples an output of a stage of the ring oscillator that is two stages earlier than a stage corresponding to the multiplexer to an output of the multiplexer.

4. The performance-screen ring oscillator test structure of claim 1, wherein a mode for a given stage is hardwired.

5. The performance-screen ring oscillator test structure of claim 1, wherein the one or more multiplexers include one or more input ports configured to obtain, as input, a load selector signal configured to select a mode for one or more stages of the performance-screen ring oscillator (PSRO).

6. A performance-screen ring oscillator (PSRO) test structure, the performance-screen ring oscillator (PSRO) test structure comprising:
   a ring oscillator having a plurality of stages;
   one or more selectable loads, each selectable load being coupled to an output of a corresponding one of the stages of the ring oscillator; and
   one or more multiplexers, each multiplexer being coupled to an output of at least one stage of the ring oscillator and being configured to select a configuration of the corresponding selectable load, wherein the selectable load in a first mode is a 180 degree out-of-phase signal.

7. The performance-screen ring oscillator test structure of claim 6, wherein at least one multiplexer couples an output of a stage of the ring oscillator that is one stage earlier than a stage corresponding to the multiplexer to an output of the multiplexer.

8. A performance-screen ring oscillator (PSRO) test structure, the performance-screen ring oscillator (PSRO) test structure comprising:
   a ring oscillator having a plurality of stages;
   one or more selectable loads, each selectable load being coupled to an output of a corresponding one of the stages of the ring oscillator; and
   one or more multiplexers, each multiplexer being coupled to an output of at least one stage of the ring oscillator and being configured to select a configuration of the corresponding selectable load, wherein the selectable load in a third mode is alternating current (AC) ground.

9. The performance-screen ring oscillator test structure of claim 8, wherein at least one multiplexer is configured to couple an alternating current (AC) ground to an output of the multiplexer.

10. A performance-screen ring oscillator (PSRO) test structure, the performance-screen ring oscillator (PSRO) test structure comprising:
    a ring oscillator having a plurality of stages;
    one or more selectable loads, each selectable load being coupled to an output of a corresponding one of the stages of the ring oscillator; and
    one or more multiplexers, each multiplexer being coupled to an output of at least one stage of the ring oscillator and being configured to select a configuration of the corresponding selectable load, wherein the selectable load in a fourth mode is a signal having a variable phase.

11. The performance-screen ring oscillator test structure of claim 10, wherein at least one multiplexer is configured to couple an output of an active phase rotator, the active phase rotator controlled by a phase select signal, to an output of the multiplexer.

12. The performance-screen ring oscillator test structure of claim 10, wherein at least one multiplexer is configured to couple an electrical float to an output of the multiplexer.

13. The performance-screen ring oscillator test structure of claim 10, wherein the selectable load is a wire or multiple levels of wire.

14. The performance-screen ring oscillator test structure of claim 10, wherein the selectable load is a vertical interconnect.

15. A performance-screen ring oscillator (PSRO) test structure, the performance-screen ring oscillator (PSRO) test structure comprising:
    a ring oscillator having a plurality of stages;
    one or more selectable loads, each selectable load being coupled to an output of a corresponding one of the stages of the ring oscillator; and
    one or more multiplexers, each multiplexer being coupled to an output of at least one stage of the ring oscillator and being configured to select a configuration of the corresponding selectable load, wherein the selectable load in a fifth mode is an electrical float.

* * * * *